US012701098B2

(12) United States Patent
Kang

(10) Patent No.: US 12,701,098 B2
(45) Date of Patent: Aug. 4, 2026

(54) METHOD AND APPARATUS FOR SUPPORTING REMOTE ACCESS TO INTERNET OF THINGS DEVICE CONNECTED TO PRIVATE NETWORKS

(71) Applicant: KT CORPORATION, Gyeonggi-do (KR)

(72) Inventor: Hyo-Sung Kang, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 385 days.

(21) Appl. No.: 18/213,026

(22) Filed: Jun. 22, 2023

(65) Prior Publication Data

US 2023/0421527 A1     Dec. 28, 2023

(30) Foreign Application Priority Data

Jun. 22, 2022     (KR) ........................ 10-2022-0076145

(51) Int. Cl.
*H04L 61/2517* (2022.01)
*H04L 61/4511* (2022.01)
*H04L 101/618* (2022.01)

(52) U.S. Cl.
CPC ...... *H04L 61/2517* (2013.01); *H04L 61/4511* (2022.05); *H04L 2101/618* (2022.05)

(58) Field of Classification Search
CPC ............. H04L 61/2517; H04L 61/4511; H04L 2101/618; H04L 61/2567; H04L 61/5014; H04L 61/2514; H04L 61/5076; H04L 61/5038; H04L 61/5046; H04L 61/5053; H04L 67/12
See application file for complete search history.

(56) References Cited

U.S. PATENT DOCUMENTS

| | | | |
|---|---|---|---|
| 2005/0152287 A1 | 7/2005 | Yokomitsu et al. | |
| 2007/0110039 A1 | 5/2007 | Park | |
| 2009/0059945 A1 | 3/2009 | Yokomitsu et al. | |
| 2013/0013739 A1* | 1/2013 | Grimault | H04L 61/2517 |
| | | | 709/217 |
| 2016/0164831 A1* | 6/2016 | Kim | H04L 61/2589 |
| | | | 709/223 |

(Continued)

FOREIGN PATENT DOCUMENTS

| | | |
|---|---|---|
| JP | 2005-198145 A | 7/2005 |
| KR | 10-0656474 B1 | 12/2006 |
| KR | 10-2312516 B1 | 10/2021 |

*Primary Examiner* — Rachel J Hackenberg
(74) *Attorney, Agent, or Firm* — IP Legal Services, LLC

(57)     ABSTRACT

Provided are a method and apparatus for supporting a remote access to an Internet of things (IoT) device connected to a private network. The apparatus may include a memory configured to store information and data received from or transmitted to other devices, and generated in the apparatus and store a port forwarding table, a transceiver circuit configured to receive a remote access request message including a service port number of an IoT device connected to a private network from a user equipment of a network operator connected to the router through a public network, and a processor circuit configured to perform port forwarding between the user equipment and the IoT device using a private IP address corresponding to the service port number of the IoT device based on the port forwarding table stored in the memory.

12 Claims, 11 Drawing Sheets

(56) References Cited

U.S. PATENT DOCUMENTS

2018/0309786 A1* 10/2018 Apelewicz ............ H04W 12/04
2018/0343231 A1* 11/2018 Terajima ............. H04L 61/5076
2019/0268310 A1* 8/2019 Guberman ............. H04L 67/10
2021/0336967 A1* 10/2021 Yasukawa ............. H04W 40/22
2023/0422025 A1* 12/2023 Ohnuma ................. H04W 8/26

* cited by examiner

METHOD AND APPARATUS FOR SUPPORTING REMOTE ACCESS TO INTERNET OF THINGS DEVICE CONNECTED TO PRIVATE NETWORKS

BACKGROUND

The present disclosure relates to supporting remote access to Internet of Things (IoT) devices connected to private networks.

The domain name service (DNS) allows clients to communicate with remote computers or servers using domain address instead of Internet Protocol (IP) addresses. FIG. 1 illustrates the operating principle of a domain name service (DNS). Referring to FIG. 1, device 110 is assigned with a fixed IP address '10.0.0.2'. Network user 140 uses the fixed IP address '10.0.0.2' to access device 110 through public network 130 (e.g., Internet). However, it is impractical for network users to memorize IP addresses of devices that the network users want to remotely access. To address this issue, the domain name service (DNS) is introduced. The domain name service is a system that translates domain names into IP addresses and vice versa. For example, a DNS server stores a DNS table that contains domain names (e.g., test.aaa.com) respectively mapping to corresponding IP addresses (e.g., 10.0.0.2). DNS server 120 is installed on public internet 130 and translates domain names (e.g., test.aaa.com) into IP addresses (e.g., 10.0.0.2). That is, when network user 140 uses a domain name (e.g., test.aaa.com) to access device 110, DNS server 120 translates the domain name (e.g., test.aaa.com) to the IP address (e.g., 10.0.0.2) assigned to device 110.

Hereinafter, the detailed process of how to access a device using a domain name will be described. When network user 140 attempts to connect to device 110 with the domain address 'test.aaa.com', DNS server 120 is requested for an IP address corresponding to the domain address 'test.aaa.com'. DNS server 120 provides the IP address '10.0.0.2' corresponding to the domain address 'test.aaa.com' from the DNS table. Ultimately, network user 140 can access device 110 using the received IP address '10.0.0.2' provided from DNS server 120. Therefore, network user 140 is able to access device 110 more easily using such a pre-designated string-based domain address, rather than an IP address.

However, there are two limitations to applying such a domain name service in practical networks. First, the domain name service (DNS) primary targets public IP addresses. Typically, devices used in home or offices are assigned private IP addresses. Even if the DNS server defines the corresponding private IP addresses as a domain address in its DNS table, the network user cannot communicate with the destination over the Internet because the IP address corresponding to the domain name is a private IP address.

Secondly, the domain name service (DNS) primarily targets fixed IP addresses. Common commercial devices typically have dynamically assigned private IP addresses through a dynamic host configuration protocol (DHCP) server, rather than static IP addresses. Therefore, even if a specific IP address is matched to a domain address in the DNS table, the IP address of the device is not fixed but leased. As the lease period expires, the IP address may change, requiring updates to the DNS table to ensure that the domain address points to the correct IP address.

On the other hand, a dynamic domain name service (DDNS) is introduced to address the limitation of fixed IP addresses in domain name services. FIG. 2A shows a service structure and an operation process of a dynamic domain name service (DDNS). Referring to FIG. 2A, DDNS server 220 has DDNS table 221 and translates a domain name to a certain IP address based on DDNS table 221, which is very similar to the domain name service (DNS). However, the dynamic domain name service (DDNS) requires a separate DDNS client to be installed in user device 210 to communicate with DDNS server 220 unlike the domain name service (DNS).

Referring to FIG. 2A, when the dynamic IP address '10.0.0.2' assigned to device 210 expires and changes to '11.0.0.3' at step 1, the DDNS client installed in device 210 transmits the updated IP address information of device 210 to DDNS server 220 at step 2. Upon receipt of the updated IP address from device 210, DDNS server 220 deletes the previously defined IP address mapped to the domain address 'test.aaa.com' in DDNS table 221 and refreshes it with the new IP address.

FIG. 2B shows an operation process of a dynamic domain name service (DDNS). Referring to FIG. 2B, when network user 240 attempts to access device 210 with the domain address 'test.aaa.com', DDNS server 210 is requested to translate the domain address to a corresponding IP address at step 1. In response, DDNS server 210 obtains the IP address of '11.0.0.3' corresponding to the domain address 'test.aaa.com' from DDNS table 221 and provides the obtained IP address '11.0.0.3' to network user 240 at step 2. Ultimately, network user 240 becomes able to access device 210 using the IP address '11.0.0.3' provided from DDNS server 220 at step 3.

As described, the dynamic domain name service (DDNS) matches domain addresses with dynamic IP addresses although an IP address assigned to each device is dynamically changed unlike the DNS system. Because of the dynamic domain name service (DDNS), it becomes easier to access devices. However, the dynamic domain name service (DDNS) still has limitation of primarily targeting a private IP address.

Internet of Things (IoT) refers to a network of physical devices, vehicles, appliances, and other objects embedded with sensors, software, and connectivity that enables them to collect and exchange data over the internet. For example, an IoT device detects sensor data, transmits it to external applications or provides specific services based on the sensed data.

IoT devices can have different connectivity structures depending on how they are connected to the external network. For example, some IoT devices are equipped with a SIM card (USIM chip) that allows them to obtain a public IP address and connect to the Internet directly through a LTE or 5G network, by passing base stations. Others may use a SIM card in a router to obtain a public IP address and connected to the Internet, while the IoT devices themselves are connected to the router via a wireless network (e.g., WiFi) and assigned private IP addresses, communicating with the Internet through the router acting as a gateway. The former case is commonly seen in private networks where smartphones connect, while the latter case can be observed in public wireless networks (e.g., WiFi) such as those found in subways or buses.

FIG. 3A shows a typical commercial IoT network. Referring to FIG. 3A, the typical commercial IoT network includes router 320 and multiple IoT devices 310. Router 320 is connected to public network 330 (e.g., Internet) through an LTE/5G network, and multiple IoT devices 310 are connected to router 320 through wireless network 340

(e.g., WiFi network). Router 320 enables multiple IoT devices 310 to connect to public network 330 through LTE/5G network.

Router 320 includes a DHCP server module that allocates IoT devices 310 with dynamic private IP address, that assign router 320 as a gateway. When IoT devices 310 communicate with the external network such as public network 330, IoT device 310 uses the router's public IP address as an origin address instead of using their own private IP addresses by changing their own private IP addresses to router's public IP address.

FIG. 3B is a diagram describing the limitations of the typical commercial IoT network. Referring to FIG. 3B, in such a commercial IoT network structure, it is not possible for network users to remotely control IoT devices 310 through external public network 330 because of the differentiation between network domains. As shown in FIG. 3A, there is a division between a public network domain and a private network domain. Due to this separation (division), it is not feasible to remotely manage IoT devices 310 through external public network 330.

As shown in FIG. 3B, network users may be able to remotely access and control router 320 through the public network. However, network users cannot remotely access and control IoT devices 310 located within the private network domain without configuring separate relaying settings in router 320. These relaying settings include port forwarding and network address translation (NAT) configuration. It is important to note that these settings are not automatically configured and require direct remote access to the router or terminal connection for manual configuration by network users.

Furthermore, IoT devices 310 have dynamic IP addresses. It means dynamic IP addresses assigned to IoT devices 310 can be changed to different private IP addresses at any time when the lease thereof expires. As a result, whenever the dynamic IP address of an IoT device changes, the network users must remotely access the router and manually modify the relay setting to reflect the new IP address. This process needs to be repeated every time that the IP address of an IoT device is updated.

SUMMARY

In accordance with an aspect of the present embodiment, a database linked domain name service (DNS) system may be provided for enabling a user equipment of a network operator (or network user) to remotely control Internet of Things (IoT) devices each having a private IP address.

In accordance with another aspect of the present embodiment, a domain name may be used with a service port number to remotely access IoT devices having private IP addresses through a router.

a method and apparatus may be provided for supporting remote access to IoT devices connected to private networks.

In accordance with one embodiment, an apparatus may be provided for supporting a remote access to an Internet of things (IoT) device connected to a private network. The apparatus may include a memory configured to store information and data received from or transmitted to other devices, and generated in the apparatus and store a port forwarding table, a transceiver circuit configured to receive a remote access request message including a service port number of an IoT device connected to a private network from a user equipment of a network operator connected to the router through a public network, and a processor circuit configured to perform port forwarding between the user equipment and the IoT device using a private IP address corresponding to the service port number of the IoT device based on the port forwarding table stored in the memory.

The processor circuit may be configured to determine data validity connected IoT device information based on the connected IoT device information and registered IoT device information; and the transceiver circuit may be configured to transmit an update request message a database for update the registered IoT device information based on the determination result, wherein the registered IoT device information is updated at the database based on the update request message.

The processor circuit may be configured to: allocate the private IP address to the IoT device connected to the router and manage the allocated private IP address and connected IoT device information on the IoT device; and collect information on registered IoT device information for IoT devices registered at the database from the database, wherein the connected IoT device information includes a MAC address, a private IP address, a service port number, a lease period of the private IP address, and a public IP address of the router.

The processor circuit may be configured to: compare a number of private IP addresses allocated to IoT devices connected to the router with a number of IP addresses registered at the database; and determine that a new IoT device is connected to the router or a connected IoT device is released in an event that the number of private IP addresses allocated to IoT devices is not matched with the number of IP addresses registered at the database.

The processor circuit may be configured to: transmit an update request message including the connected IoT device information to the database in an event that the number of private IP addresses allocated to IoT devices is not matched with the number of IP addresses registered at the database.

The processor circuit may be configured to assign an internal port number and an external port number in the port forwarding table with the service port number of the IoT device and assign an internal IP address included in the port forwarding table with the private IP address.

A domain address mapped to the IoT device and an IP address of a router connected to the IoT device may be managed through a domain name service (DNS) table.

In an event that the domain address mapped to the IoT device is transmitted to the DNS server from a user equipment of a network operator, the IP address of the router corresponding to the domain address may be transmitted to the user equipment from the DNS server, and the user equipment may be connected to the router through the IP address of the router.

In an event that a remote access request message including a service port number of the IoT device is received from the user equipment, processor circuit may be configured to receive an internal IP address mapped to the internal port number based on a port forwarding table that manages an internal port number corresponding to the service port number of the IoT device and transmit the remote access request message to the IoT device.

In accordance with another embodiment, a method may be provided for supporting remote access to an IoT device connected to a private network. The method may include receiving a remote access request message including a service port number of an IoT device connected to a private network from a user equipment of a network operator, connected to the router through a public network; and performing port forwarding between the user equipment and the IoT device using a private IP address corresponding to the service port number of the IoT device based on a port forwarding table.

In accordance with still another embodiment, a non-transitory computer-readable medium may be provided for storing computer-readable instructions such that, when executed, cause a process of a computer to perform a method of supporting remote access to an IoT device connected to a private network. The method may include receiving a remote access request message including a service port number of an IoT device connected to a private network from a user equipment of a network operator, connected to the router through a public network; and performing port forwarding between the user equipment and the IoT device using a private IP address corresponding to the service port number of the IoT device based on a port forwarding table.

DETAILED DESCRIPTION OF EMBODIMENTS

In accordance with one embodiment, an IoT device connected to a private network may be remotely accessed from a user equipment of a network operator located outside the private network. To remotely access, a port forwarding process may be performed in a router between the user equipment and the IoT device based on a port forwarding table. The port forwarding process may be performed with a private IP address of the IoT device, a public IP address of the router, a service port number of the IoT device, and a domain name. The user equipment may transmit a remote access request message including the domain name with the service port number of the IoT device to the router to access the IoT device.

In accordance with another embodiment, a port forwarding domain name service (PF-DNS) server and a port forwarding domain name service (PF-DNS) database may be provided for enabling a user equipment of a network operator (or network user) to remotely control Internet of Things (IoT) devices each having a private IP address. The PF-DNS server and the PF-DNS database may update and maintain information on IoT devices connected to the router to enable the user equipment to remote access the IoT device.

In accordance with still another embodiment, the PF-DNS database, the PF-DNS server, and the router may collaborate to maintain the same and real-time information on IoT devices connected to the router in order to improve the data validity.

By supporting remote access to IoT devices connected to the dynamic private IP address network through the router according to embodiments, surveillance blind spots may be improved. Fast IoT network management may be enabled without the need for on-site visits by communication network operators, by providing remote automation settings from configuring the domain address of the DDNS server to setting up port forwarding through the router. According to an embodiment, a network operator (e.g., network user) is able to access IoT devices connected in a private network through a router using an associated domain address defined in a PF-DNS table of a PF-DNS server.

Figure 1:
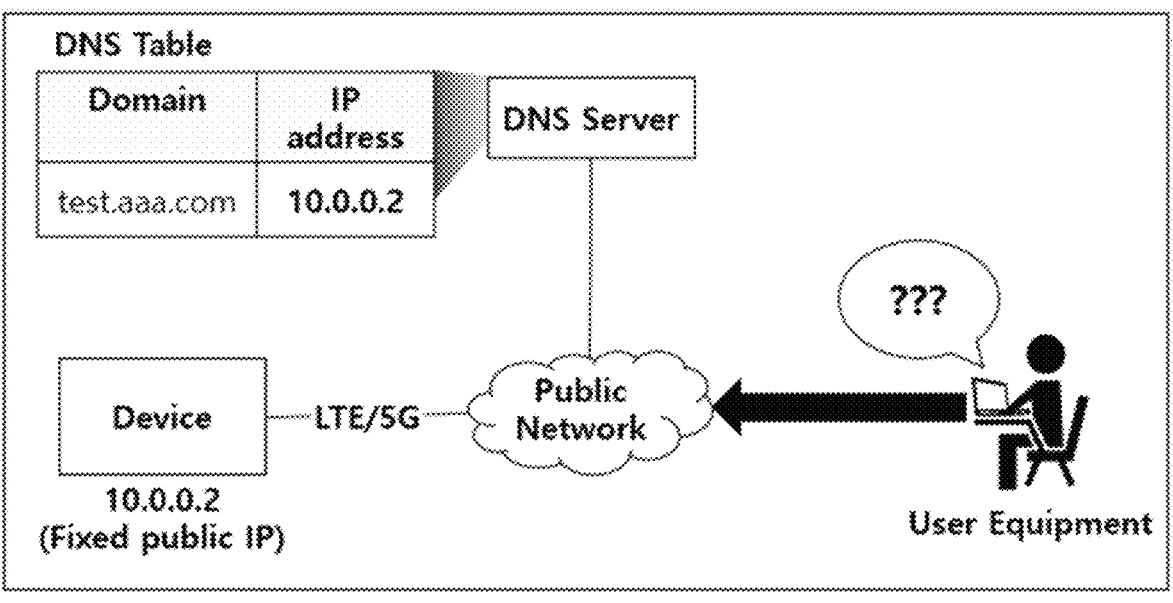
FIG. 1 illustrates the operating principle of a domain name service (DNS).
Figure 2A:
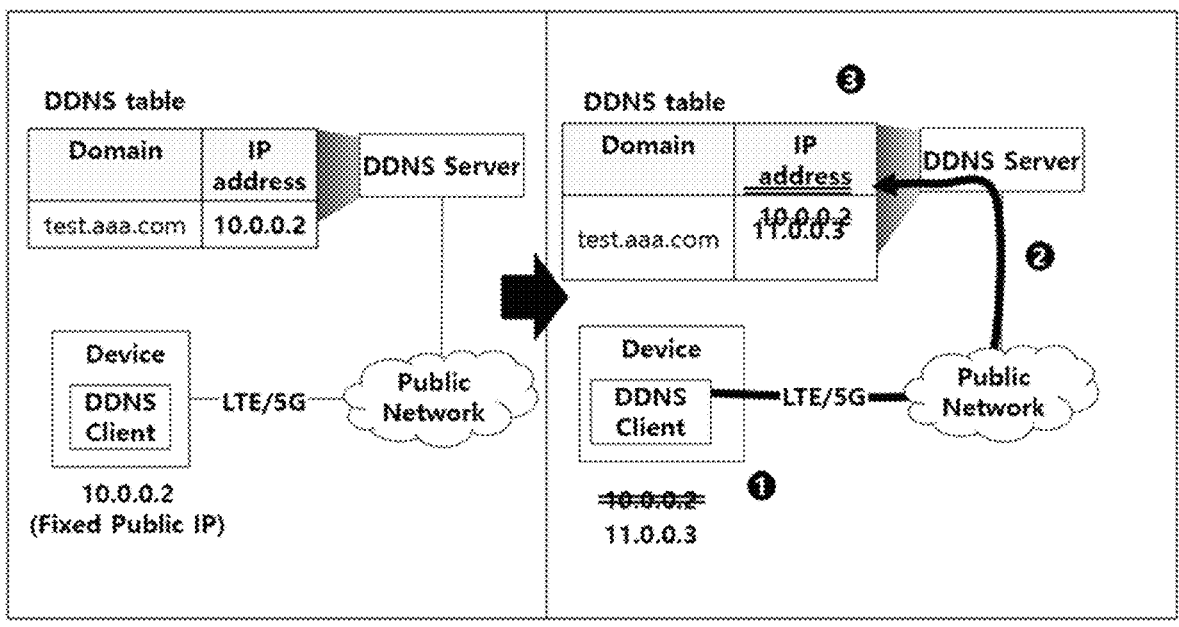
FIG. 2A shows a service structure and an operation process of a dynamic domain name service (DDNS).
Figure 2B:
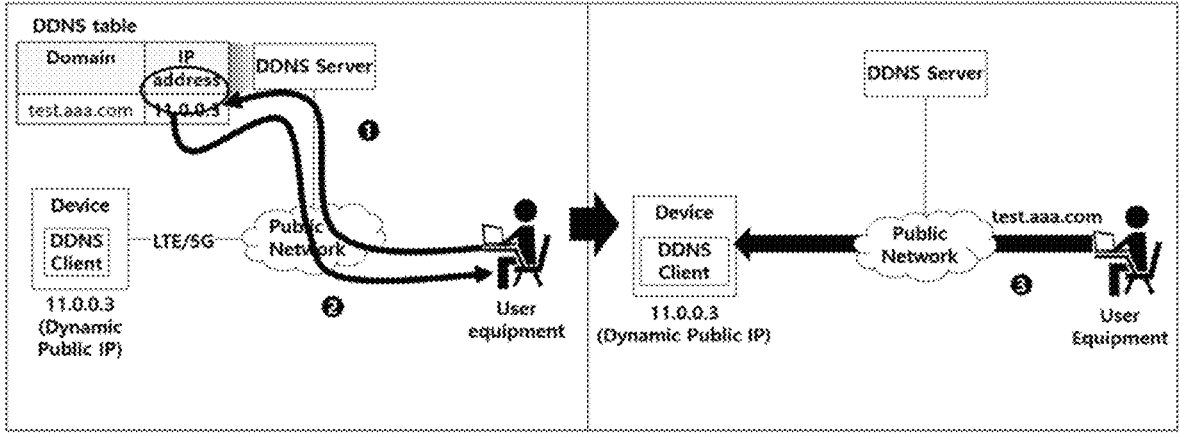
FIG. 2B shows an operation process of a dynamic domain name service (DDNS).
Figure 3A:
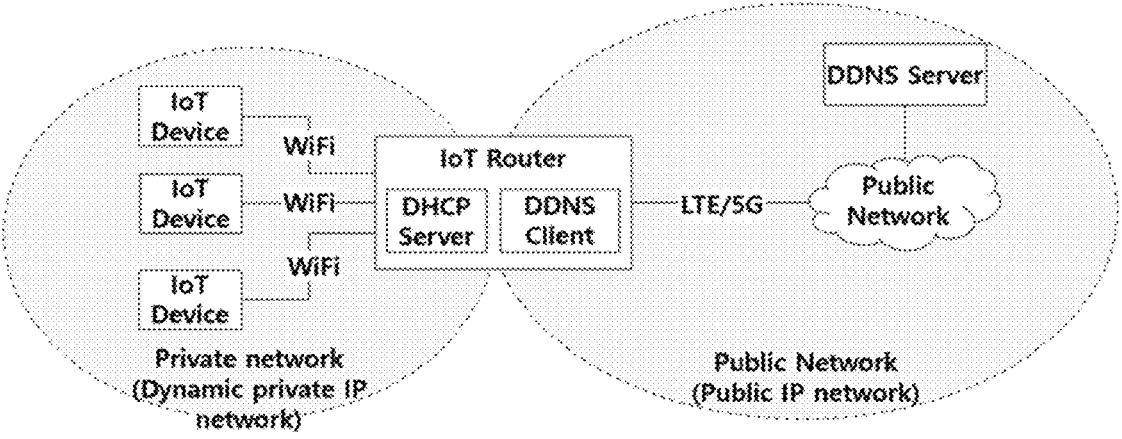
FIG. 3A shows a typical commercial IoT network.
Figure 3B:
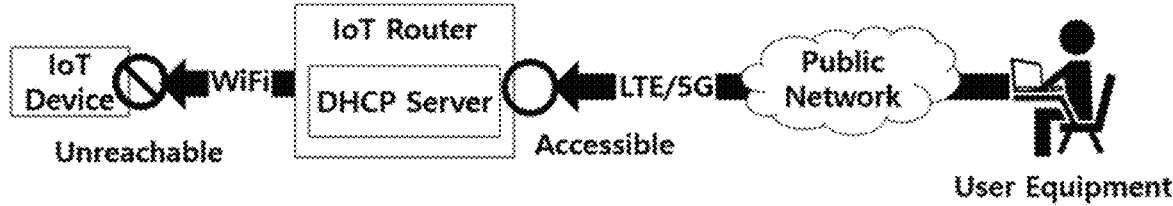
FIG. 3B is a diagram explaining the limitations of a typical commercial IoT network.
Figure 4:
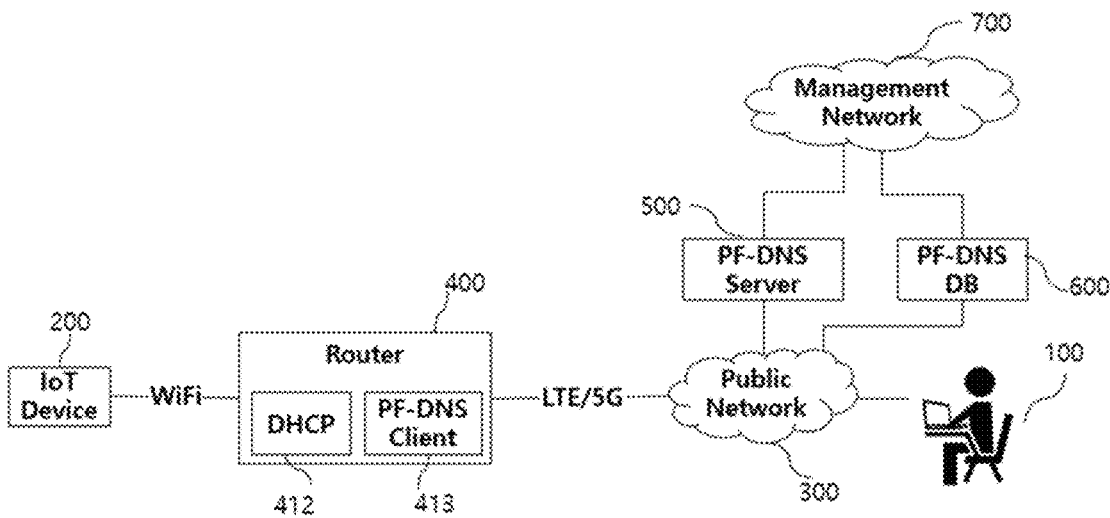
FIG. 4 is a diagram illustrating supporting remote access of IoT devices connected to a private network according to an embodiment.

Hereinafter, a remote access process through a port forwarding process between a user equipment and an IoT device performed using a private network address corresponding to a service port number of the IoT device based on a port forward table will be described with reference to FIG. 4. FIG. 4 is a diagram illustrating supporting remote access of IoT devices connected to a private network according to an embodiment.

Referring to FIG. 4, user equipment 100 is connected to public network 300 and connected to IoT device 200 through router 400. Port forwarding domain name service (PF-DNS) database 600 and port forwarding domain name service (PF-DNS) server 500 are connected to public network 600. IoT device 200 may be connected to router 400 through a private network (e.g., WiFi).

User equipment (UE) 100 may be an electron device having i) communication capability for communicating with other devices through communication networks and transmitting and receiving data for a predetermined service, such as monitoring a certain area through a CCTV, and ii) processing capability for processing the data from other devices and provide the predetermined service to a network user (e.g., operator). For example, user equipment (UE) 100 may include a computer, a smart phone, a tablet, a wearable device, and any portable device equipped with a processor, a memory, a screen (e.g., monitor or display) and a communication module.

In accordance with an embodiment, user equipment 100 may be a computer that remotely accesses IoT device 200, collects data from IoT device 200, and controls IoT device 200 in accordance with an embodiment. For example, user equipment 100 may remotely connect to IoT device 200 using its domain address and view captured video or control the device's camera for capturing images.

In accordance with an embodiment, user equipment 100 may send a remote access request message to IoT device 200 using the domain address with the service port number of IoT device 200. The request message is intended for remote access to IoT device 200. User equipment 100 may access router 400 based on router's public IP address and then transmit a network access request message to router 400 that includes the service port number of IoT device 200 connected to the private network.

IoT device 200 may be an electric device embedded with sensors, software, and network connectivity capabilities, allowing it to connect to the internet and exchange data with other device or systems. For example, IoT device 200 may receive data, message, or instructions from user equipment 100 through router 400. IoT device 200 may perform operation according to the received data, message, or instruction and provide the result of operation to user equipment 100.

In accordance with an embodiment, IoT device 200 may be connected to router 400 through a private network (e.g., WiFi network formed by router 400), and router 400 may serve as an intermediary to support user equipment 100 to remote access IoT device 200 in a private network.

When IoT device 200 initially access router 400, IoT device 200 may be assigned with a private IP address by router 400 and register it's a service port number at router 400 in accordance with an embodiment. Herein, the private IP address may be assigned to IoT device 200 with a predetermined lease period, for example, one month.

Port forwarding domain name service (PF-DNS) server 500 may be a computer system that manages communication, resources, and functionalities to provide predetermined services such as a dynamic domain name service (DDNS).

In accordance with an embodiment, PF-DNS server 500 may provide a domain name service with port forwarding information (e.g., a service port number of IoT device) to enable UE 100 to remotely access IoT device 200 in cooperation with PF-DNS database 600, for example, using information on IoT devices registered at PF-DNS database (DB) 600. Herein, the information on IoT devices registered may be referred to as DB data or registered IoT device information. Further, PF-DNS server 500 may generate, store, and manage a PF-DNS table that includes domain addresses and service port numbers for IoT devices connected to each router and a public IP address of associated router using information stored in PF-DNS DB 600.

In accordance with an embodiment, PF-DNS server 500 may receive a message including a domain name address with a service port number from user equipment 100, extract an IP address corresponding to the domain name address from a PF-DNS table, and transmit the extracted IP address to user equipment 100. The PF-DNS table is a table that manages the domain address for IoT device 200 and the public IP address of router 400 to which IoT device 200 is connected. The IP address delivered to user equipment 100 is the public IP address of router 400.

PF-DNS database (DB) 600 may be a computer system that manages communication, resources, and functionalities to provide predetermined services such as a database service.

In accordance with an embodiment, PF-DNS database 600 may manage and store information on IoT devices registered at PF-DNS database 600 or PF-DNS server 500 in association with a corresponding router. PF-DNS database 600 may manage and store information on domain name addresses (or domain addresses) assigned or registered to IoT devices. Herein, the information on IoT devices may be referred to as DB data or registered IoT device information. Such registered IoT information or DB data may include a MAC address of a corresponding IoT device, a private IP address of a corresponding IoT device, a service port number of a corresponding IoT device, a lease periods of a corresponding private IP address, and a public IP address of a router that a corresponding IoT device accesses in accordance with an embodiment.

PF-DNS database 600 and PF-DNS server 500 may be located at a data center or a headquarters of a telecommunication company and enable IoT devices to connect to external network through the telecommunication network.

In accordance with an embodiment, PF-DNS server 500 may communicate directly with PF-DNS database 600. For example, DDNS server 500 may be connected directly through management network 700, but the embodiments are not limited thereto.

Management network 700 may be a private network or a local area network formed for a specific purpose. For example, management network 700 may be formed for directly connecting PF-DNS server 500 and PF-DNS database 600 for providing secure and controlled communication.

Public network 300 may be a communication network including a computer network (e.g., wide-area network) and a telecommunication network (e.g., LTE/5G) for communication and data exchange between different users and devices. Public network 300 may include the internet, the telecommunication network (e.g., LTE/5G), public Wi-Fi networks, or other publicly accessible network infrastructures, but the present embodiments are not limited thereto.

The private network may be a communication network for use within a specific organization, entity, or group. The private network may include a wi-fi network formed by a router in accordance with an embodiment.

In FIG. 4, PF-DNS server 500 and PF-DNS database (DB) 600 are illustrated and described as an independent server or entity. However, the embodiments are not limited thereto. For example, PF-DNS server 500 may include PF-DNS database 600 as a constituent part thereof or one computer server may include all functions of PF-DNS server 500 and PF-DNS database 600 together in accordance with another embodiment.

Router 400 may be a networking device that serves as a central point of connection between multiple devices within a local area network (LAN, e.g., private network) or between different networks. Router 400 acts as a bridge or gateway, facilitating the transfer of data packets between devices or networks.

Router 400 may be equipped with a universal subscriber identity module (USIM) chip. Router 400 may be allocated with a public IP address and act as a bridge or gateway for enabling IoT devices in a private network to communicate with devices outside the private network in accordance with an embodiment.

In accordance with an embodiment, router 400 may receive a network access request message from user equipment 100, which includes the service port number of IoT device 200. Router 400 may perform port forwarding between user equipment 100 and IoT device 200 using the private IP address corresponding to the service port number of IoT device 200 based on the stored port forwarding table. The port forwarding table may include the internal port number, external port number, and internal IP address. The internal port number and the external port number are set to the service port information of IoT device, and the internal IP address may be set to the private IP address of the IoT device 200.

Figure 5:
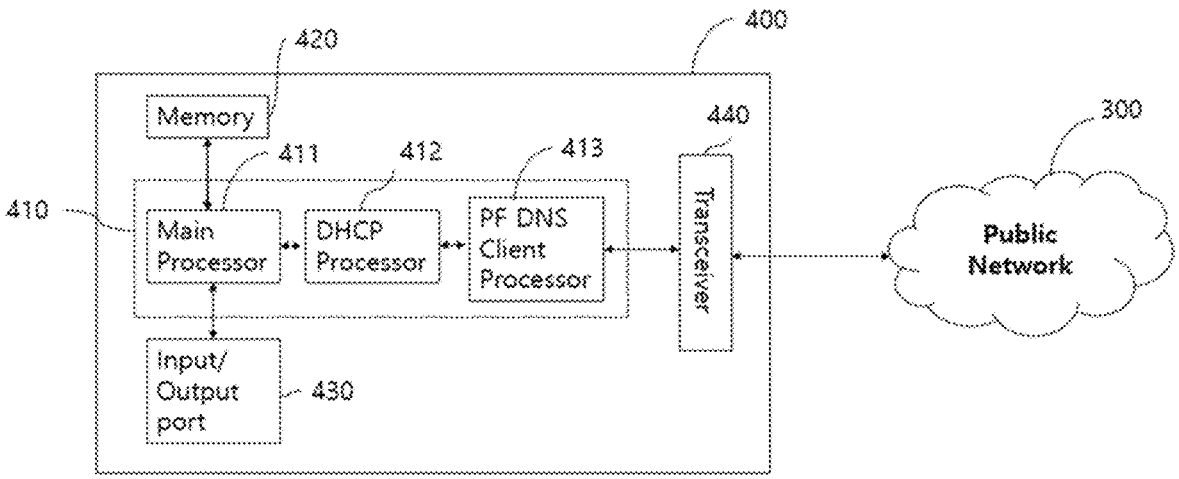
FIG. 5 illustrates a router in accordance with an embodiment.

Hereinafter, router 400 will be described in more detail with reference to FIG. 5. FIG. 5 illustrates a router in accordance with an embodiment.

Referring to FIG. 5, router 400 may include processor circuit 410, memory 420, input/output port 430, and transceiver circuit 440 in accordance with an embodiment. Processor circuit 410 may include main processor 411, DHCP processor 412, and PF DNS client processor 413.

Input/output port 430 may be a port for receiving signals and data from a user or other device.

Memory 420 may store a variety of information, such as software programs for operation, data received from other entities, and data generated as result of operations. That is, memory 420 may store operation system data, applications, and related data, received from other entities through a variety of communication media (e.g., communication networks). Memory 420 may include at least one of an internal memory and an external memory according to embodiments. For example, memory 420 may be a flash memory, hard disk, multimedia card micro memory, SD or XD memory, Random Access Memory (RAM), Static Random-Access Memory (SRAM), Read-Only Memory (ROM), Programmable Read-Only Memory (PROM), Electrically Erasable Programmable Read-Only Memory (EEPROM), magnetic memory, magnetic disk, or optical disk, a SD card, a USB memory, but is not limited thereto.

In accordance with an embodiment, memory 420 may include a port forwarding table including the internal port number, external port number, and internal IP address of each IoT device.

Transceiver circuit 440 may communicate with other entities including IoT device 200, PF-DNS server 500, PF-DNS database 600, and user equipment 100.

Transceiver circuit 440 may include at least one circuitry module (or at least one circuit) for communicating with other entities through hybrid communication network 300. Herein, the communication network may include a variety of communication networks such as a wireless communication network and a wired communication network. For example, the communication network may include a wideband code division multiple access (WCDMA) network, a microwave access (WiMAX) network, a wireless fidelity (WiFi) network, a long term revolution (LTE) network, x digital subscriber line (xDSL) network, a hybrid fiber-coaxial (HFC) network, a satellite network, a global system for mobile communication (GSM) edge radio access network (GERAN), a universal terrestrial radio access network (UTRAN), an evolved universal terrestrial radio access network (E-UTRAN), a wireless local area network (W-LAN), a public switched telephone network (PSTN), an integrated services for digital network (ISDN), an international mobile telecommunications (IMT)-2000 network, a wired area network (WAN), a local area network (LAN), a metropolitan area network (MAN), a cable television (CATV), third generation partnership project core networks (3GPP-CNs), an European telecommunications standards institute telecommunication & internet converged service & protocols for advanced networks core network (ETSI TIS-PAN CN), a 3GPP2 CN, a machine to machine (M2M) network, a broadcast network, a radio frequency identification (RFID) network, a near field communication (NFC) network, a ultra-wideband (UWB) network, a Bluetooth communication network, but the present disclosure is not limited thereto. In at least one embodiment, communication circuit 1300 may include at least one of a wireless communication circuit and a wired communication circuit. Herein, the wireless communication circuit and wired communication may be separately or integrally configured.

Processor circuit 410 may include main processor 411, DHCP processor 412, and PF DNS client processor 413 in accordance with one embodiment. Main processor 411 may perform or control overall operation of hybrid router 400. For example, main processor 411 may be a central processing circuitry that controls constituent elements of router 400 for supporting remote access to IoT device through port forwarding.

Dynamic host configuration protocol (DHCP) processor 412 may be designed to perform that automatic assignment of private IP addresses and network configuration parameters to devices (e.g., IoT device) on a private network. That is, DHCP processor 412 manages and allocates IP addresses dynamically to IoT devices connected to router 400 in accordance with an embodiment.

PF-DNS client processor 413 may be designed to perform operations for enabling user equipment 100 to remotely access IoT device 200 in a private network using a domain name with a service port number in cooperation with main processor 411 and DHCP processor 411 in cooperation with PF-DNS server 500 and PF-DNS database 600 in accordance with one embodiment.

DHCP processor 412 and PF-DNS client processor 413 may be described as two independent processors, but embodiments are not limited thereto. For example, one processor may be provided to perform all functions of DHCP processor 412 and PF-DNS client processor 413. Further, DHCP processor 412 and PF-DNS client processor 413 may be provided as software modules in another embodiment.

Hereinafter, a method for supporting remote access to IoT devices connected to a private network through a port forwarding domain name service (PF-DNS) server and a PF-DNS database in accordance with an embodiment will be described with the accompanying drawings.

Figure 6:
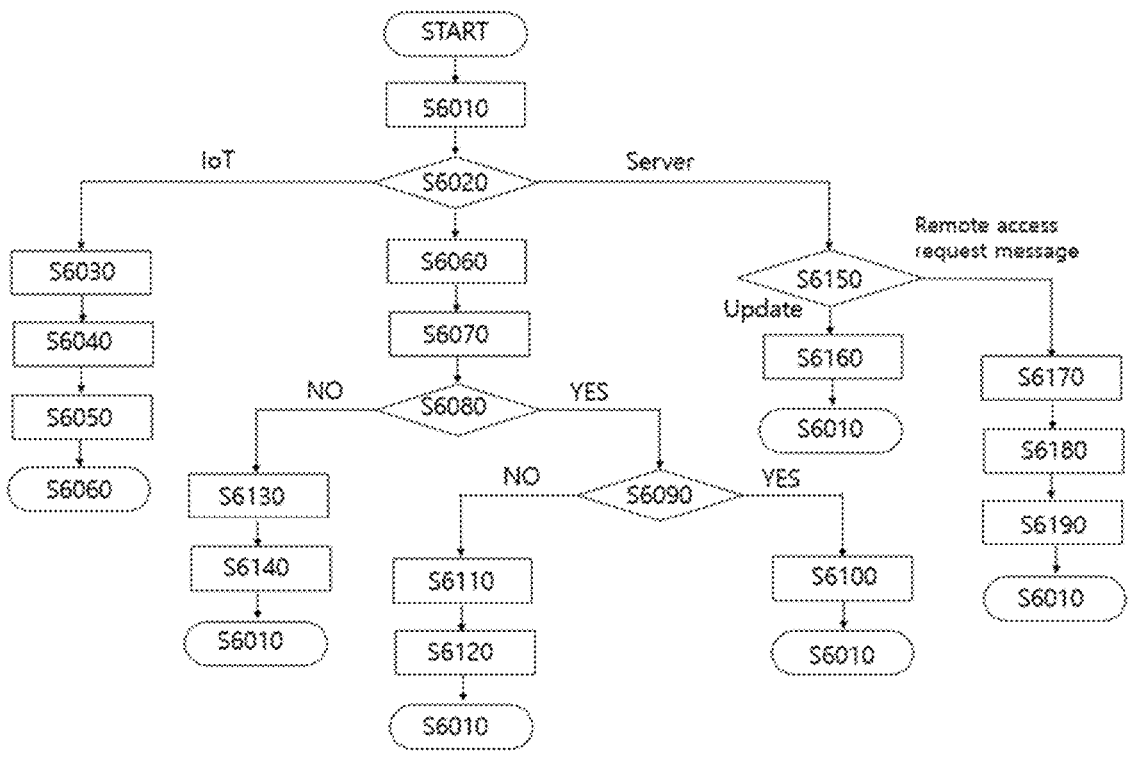
FIG. 6 is a flowchart illustrating a method of a router for supporting remote access to IoT devices connected to a private network through a port forwarding-domain name service (PF-DNS) server and a PF-DNS database in accordance with an embodiment.

FIG. 6 is a flowchart illustrating a method of a router for supporting remote access to IoT devices connected to a private network through a port forwarding-domain name service (PF-DNS) server and a PF-DNS database in accordance with an embodiment. For example, FIG. 6 shows an operation of a router to enable a user equipment of a network operator to remotely access IoT devices connected in a private network in accordance with an embodiment.

Referring to FIG. 6, router 400 may receive a signal from at least one of PF-DNS server 500 or user equipment 100, and IoT device 200 or generated by PF-DNS client processor 413 at step S6010. For example, router 400 may receive an initial access request message from new IoT device 200, receive an update request message from PF-DNS server 500, receive a remote access request message from user equipment 100, or receive an event triggering signal from PF-DNS client processor 413. The event triggering signal may be generated when a predetermined timer for updating is expired or whenever it is necessary to update data in router 400 and PF-DNS database 600 or check data validity between router 400 and PF-DNS database 600.

At step S6020, router 400 may determine a type of the received signal, such as the initial access request message from IoT device 200, the update request message from PF-DNS server 500, the remote access request message from user equipment 100, or the event triggering signal from PF-DNS client processor 413.

Figure 9:
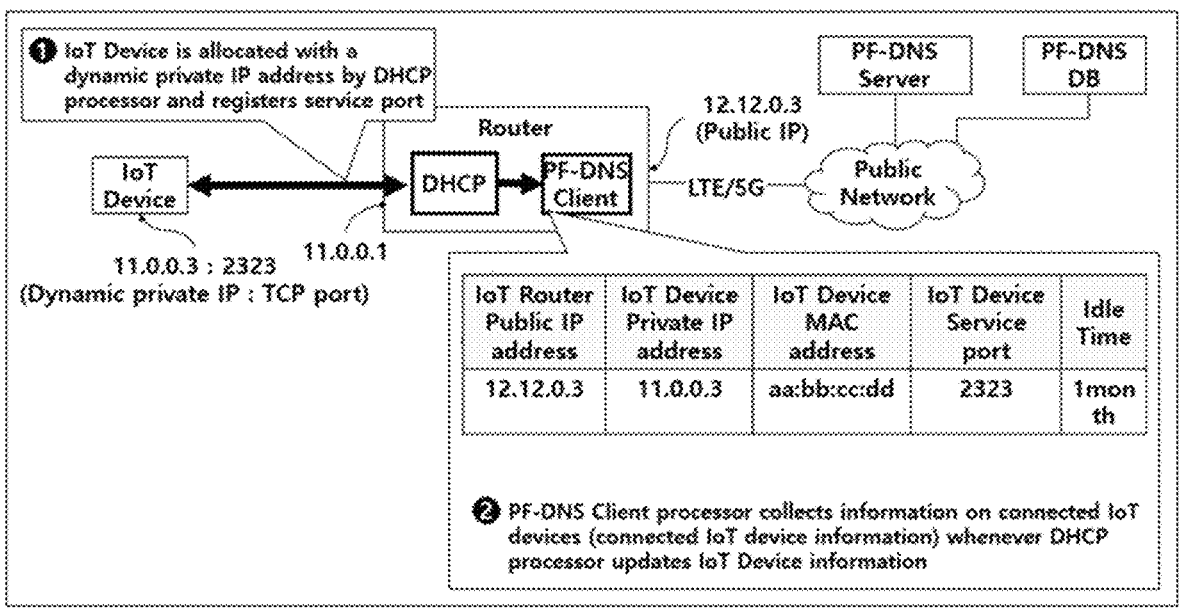
FIG. 9 is a diagram explaining the operation of a router when a new IoT device initially accesses the router in accordance with an embodiment.

In case of the initial access request message from IoT device 200 at S6020-IoT, router 200 performs operations for handing initial access from IoT device 200 at step S6030 to S6050. Such an operation for handing initial access from IoT device 200 is shown in FIG. 9. FIG. 9 is a diagram explaining the operation of a router when a new IoT device initially accesses the router in accordance with an embodiment. Hereinafter, the operation for handing initial access will be described with reference to FIG. 9 together with FIG. 6.

Router 400 assigns a gateway address for IoT device 200 using an internal IP address of router 400 at step S6030 and assigns a private IP address to IoT device 200 at step S6040 in accordance with an embodiment. For example, as shown in FIG. 9, when IoT device 200 is initially connected to router 400, router 400 (e.g., DHCP processor 412) may designate an internal IP address of router 400 (e.g., '11.0.0.1') as a gateway address and allocates a private address '11.0.0.3.'

At step S6050, router 400 receives information on (e.g., a registration request message) a service port number from IoT device 200 and registers the service port number of IoT device 200 in accordance with one embodiment. For example, IoT device 200 may register a service port number '2323' at router 400.

At step S6060, router 400 (e.g., PF-DNS client processor 412) may collect information on IoT device 200, such as the service port and the private IP address for IoT device 200 and maintain and store the information in memory 420, as connected IoT device information.

In accordance with an embodiment, PF-DNS client processor 412 may collect, store, and manage such connected IoT device information whenever the connected IoT device information is updated at DHCP processor 411. The connected IoT Information denotes information on IoT devices connected to router 400 and refers to as DB data or collected data in the specification.

The connected IoT device information (e.g., DB data or Collected data) may include i) a media access control (MAC) address of each IoT device connected to router 440, ii) a private IP address of each IoT device, iii) a service port number of each IoT device, iv) a lease period (Idle time) of each private IP address, and v) a public IP address of router 440.

The MAC address of IoT device is a unique identifier assigned to a network interface controller (NIC) of an IoT device. It is a hardware address that is permanently associated with an IoT device. For example, the MAC address of IoT device 200 may be set as 'aa.bb.cc.dd,' as shown in FIG. 9.

The private IP address of IoT device is an IP address allocated by DHCP processor and used within a private network. As shown in FIG. 9, IoT device 200 is assigned with '11.0.0.3' as a private IP address.

The service port number of IoT device is a transmission control protocol (TCP) port number that is used to identify a service provided by an IoT device. For example, the service port number of the IoT device 200 is '2323', as shown in FIG. 9.

The lease period of an IP address assigned to IoT devices refers to the duration of time which a private IP address is assigned to the IoT device within a network (e.g., remains active). For example, the lease period may be set to '1 month' as shown in FIG. 9, The IP address of router 400 refers to a public IP address used for connecting to the public network (e.g., Internet). For example, the IP address of router 400 may be '12.12.0.3' as shown in FIG. 9.

Referring back to FIG. 6, at step S6070, router 400 (e.g., PF-DNS client processor) may request DB data associated with router 400 from PF-DNS DB 600 through PF-DNS server 500 and receive the DB data associated with router 400 from PF-DNS DB 600 through PF-DNS server 500.

In accordance with an embodiment, router 400 may compare the collected data with the DB data associated with router 400 and determine whether newly connected IoT device has been registered before, never been registered, or has been disconnected. It is because an IoT device may be i) a new device that accesses router 400, ii) assigned with a new IP address because the period time is expired, or iii) a device has been connected but disconnected due to error. The IoT device may be distinctly registered at PF-DNS database 600.

In accordance with an embodiment, operations steps S6080 to S6140 are performed for determining a type of IoT device connected to router 400 and managing the collected data and the DB data associated with router 400. Such an operation is also shown in detail in FIG. 7, FIG. 10, and FIG. 11.

Furthermore, the operations S6060 to S6140 are also performed when the received signal is the event triggering signal at step S6020-trigger signal. Referring back to FIG. 6, in case that the received signal is the event triggering signal from PF-DNS client processor 413 at step S6020-triggering signal, router 400 (e.g., PF-DNS client processor 413) may obtain the number of private IP addresses allocated to IoT devices currently connected to router 400, which is included in collected data stored memory 420 and created and managed by DHCP processor 412 at step S6060.

At step S6070, router 400 (e.g., PF-DNS client processor) may request DB data associated with router 400 from PF-DNS DB 600 through PF-DNS server 500, receive the DB data associated with router 400 from PF-DNS DB 600 through PF-DNS server 500, and extract the number of private IP addresses registered at PF-DNS DB 600 or PF-DNS server 500 associated with router 400. The DB data may refer to as registered IoT device information.

Figure 10:
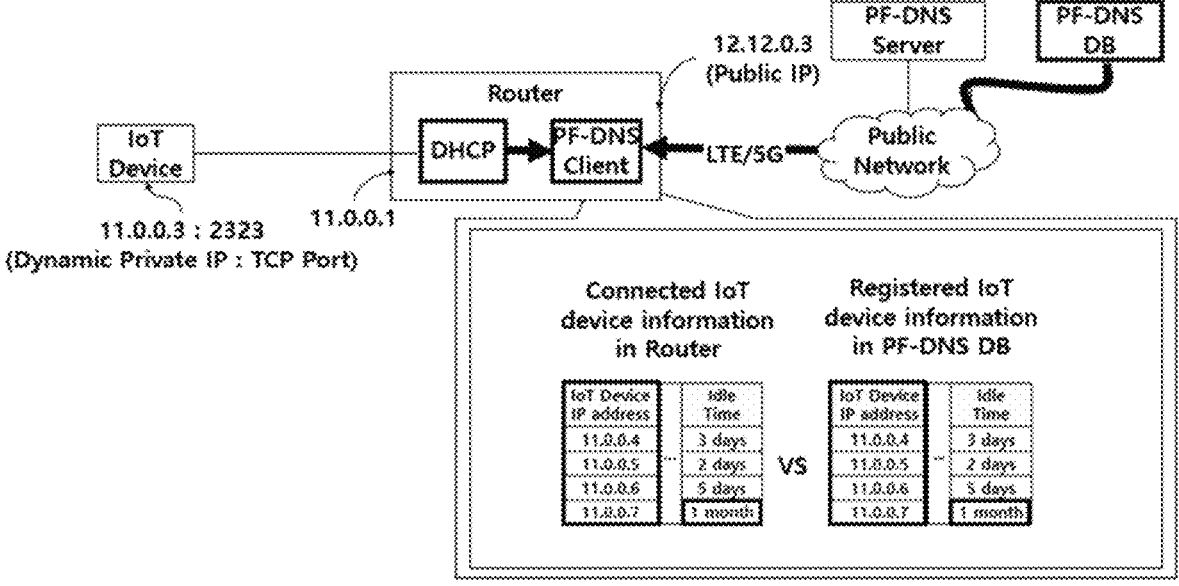
FIG. 10 shows comparing the number of IP addresses included in DB data (e.g., collected data) and that in PF-DNS data in accordance with an embodiment.

At step S6080, router 400 may determine whether the number of private IP addresses in the collected data is matched with (e.g., equal to) that in the DB data. Such operation is also shown in FIG. 10. FIG. 10 shows comparing the number of IP addresses included in DB data (e.g., collected data) and that in PF-DNS data in accordance with an embodiment. Referring to FIG. 10, router 400 may receive PF-DNS data from PF-DNS database 420 and obtain DB data from DHCP processor or memory. Then, router 400 determines the number of IP addresses assigned to IoT devices included in the DB data and same in the PF-DNS data.

When the number is matched (YES—S6080), router 400 determines whether the longest IP lease period in the collected data is identical to that in the DB data at step S6090.

When router 400 determines that the longest IP lease period in the collected data is identical to that in the DB data (YES-S6090), router 400 transmits a message for maintaining the DB data to PF-DNS server 500 and PF-DNS DB 600 at step S6100.

When the longest IP lease period is not matched (NO-S6090), router 400 may determine that the lease period of one of IoT devices registered in the PF-DNS DB 600 is expired at step S6110 and requests PF-DNS server 500 and PF-DNS DB 600 to update IP addresses, service port numbers of the DB data associated with router 400 with those in the collected data at step S6120.

Referring back to step S6080, router 400 may determine whether the number of private IP addresses in the collected data is matched with that in the DB data. If the number is not matched (No—S6080), router 400 determines that new IoT device is connected or one of IoT devices is disconnected (or released) at step S6130.

At step S6140, router 400 determines whether validity of the collected data and the DB data and requests PF-DNS server 500 and PF-DNS database 600 to update the DB data associated with router 400 based on the determination result.

Figure 7:
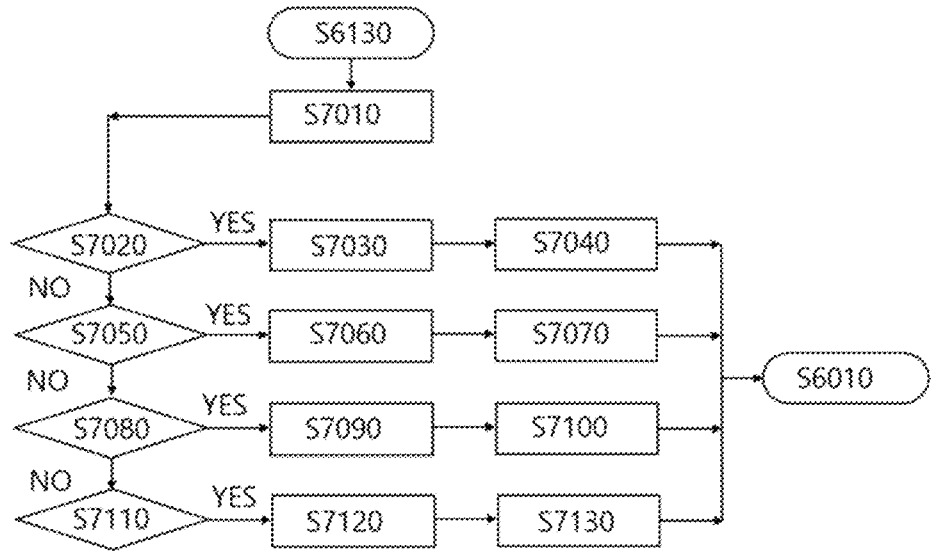
FIG. 7 illustrates a method of determining data validity of collected data and DB data and requesting a PF-DNS server and a PF-DNS database to update based on the determination result in accordance with an embodiment.
Figure 11:
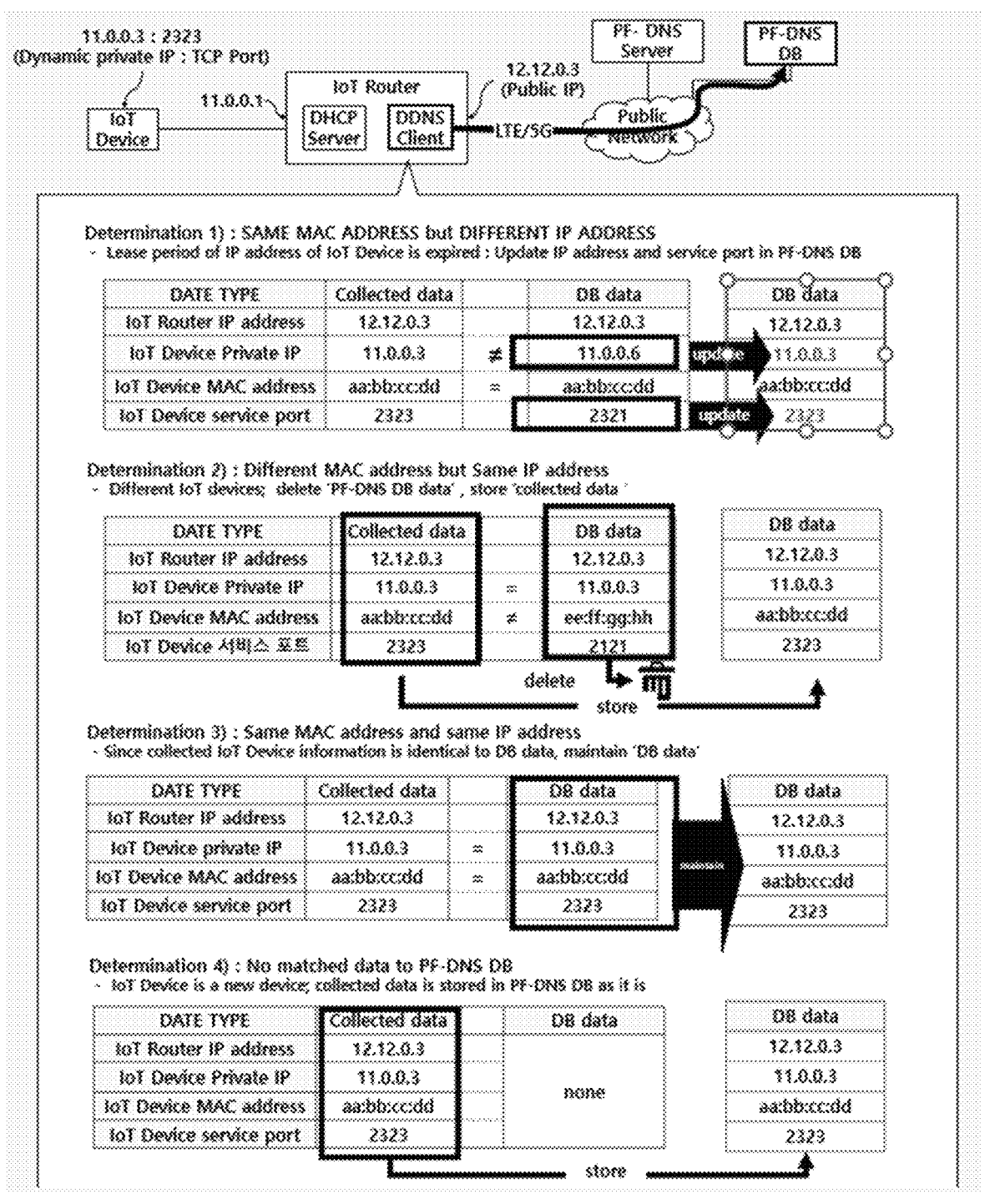
FIG. 11 shows four steps to determine whether a newly connected IoT device is a new IoT device or not.

Such data validity operation S6140 is also shown in FIG. 7 and FIG. 11. Hereinafter, the data validity operation S6140 will be described in more detail with FIG. 7. FIG. 7 illustrates a method of determining data validity of collected data and DB data and requesting a PF-DNS server and a PF-DNS database to update based on the determination result in accordance with an embodiment.

Referring to FIG. 7, if the number is not matched (No—S6080 in FIG. 6), router 400 determines that new IoT device is connected or one of IoT devices is disconnected at step S6130. Then, router 400 may, as determining the data validity of collected data and DB data (at step S6140), compares MAC addresses and IP addresses included in the collected data with those included in the DB data at step S7010.

If the MAC addresses of the collected data are identical to those of the DB data and the IP addresses of the collected data are different from those of the DB data at step S7020-YES, router 400 determines that at least one of IP addresses registered at PF-DNS server 500 or PF-DNS database 600 is expired at step S7030 and request the PF-DNS server 500 and PF-DNS database 600 to update the DB data associated with router 400 with the collected data at step S7040.

Such a request may be made by transmitting a request signal for updating to PF-DNS server 720. In response to the request, PF-DNS server 500 replaces IP addresses and service ports stored in PF-DNS database 420 with those in the collected data.

If the MAC addresses of the collected data are different from those of the DB data and the IP addresses of the collected data are identical to those of the DB data at step S7050 (YES), router 400 determines that IoT devices in the collected data are different from those in the DB data at step S7060 and request the PF-DNS server 500 and PF-DNS database 600 to delete the DB data associated with router 400 and store the collected data as the DB data associated with router 400 at step S7070.

If the MAC addresses and IP addresses of the collected data are identical to those of the DB data at step S7080 (YES), router 400 determines that IoT devices in the collected data are identical to those in the DB data at step S7090 and request PF-DNS server 500 and PF-DNS database 600 to maintain the DB data associated with router 400 at step S7100.

If the MAC addresses and IP addresses of the DB data are different from those of the PF-DNS data at step S7110 (YES), router 400 determines that a new IoT device is connected at step S7120 and request PF-DNS server 500 and PF-DNS database 600 to store the collected data as new DB data associated with router 400 at step S7130.

As described, FIG. 11 also shows examples of data validity operation in accordance with an embodiment. That is, FIG. 11 shows four steps to determine whether a newly connected IoT device is a new IoT device or not. Referring to FIG. 11, if an IoT device has the same MAC address but a different private IP address in the collected data and the DB data (e.g., determination step 1), it is determined as a lease period of a private IP address assigned to an IoT device is expired. Accordingly, a private IP address and a service port of a corresponding IoT device is updated at the DB data.

If an IoT device has a different MAC address but the same private IP address in the collected data and the DB data (e.g., determination step 2), it is determined as two different IoT devices. Accordingly, the DB data associated with the IoT device is deleted, and the collected data is stored as new DB data. If the MAC address and the IP address are identical in the collected data and the DB data (e.g., determination step 3), it is determined to maintain the DB data. If there is not identical data in the collected data and the DB data (e.g., determination step 4), it is determined to store the collected data as new DB data.

After determination shown in operation S6140, FIG. 7, or FIG. 11, IoT device information with a private address '11.0.0.3' is finally registered as a DB data (e.g., registered IoT device).

Referring back to FIG. 6, router 400 receives a signal from PF-DNS server 500 at step S6020-Server and the received signal is for updating the DB data associated with router 400 from PF-DNS server 500 at step S6150-update. Router 400 extracts a service port number from the received DB data, assigns the extracted service port as internal/external port for port forwarding, and assigns the IP address of IoT device 200 as a port forwarding target IP address at step S6160.

Figure 12:
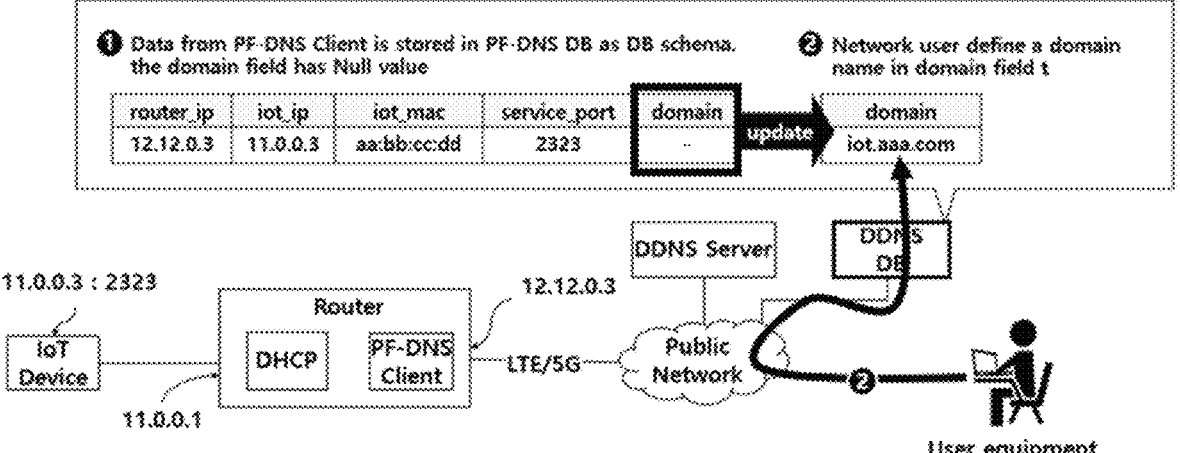
FIG. 12 shows registering an IoT device (e.g., IoT device information) at a PF-DNS server and assigning a domain name for a new IoT device in accordance with an embodiment.

FIG. 12 also shows registering an IoT device (e.g., IoT device information) at a PF-DNS server and a PF-DNS database and assigning a domain name for a new IoT device in accordance with an embodiment. Referring to FIG. 12, a registered IoT device information of IoT device 400 may be created as a DB schema in PF-DNS database 420. However, a domain name for IoT device 404 may not be assigned to be registered at PF-DNS server 500 yet. Accordingly, the DB schema for IoT device 400 has a null value in a domain name field. In this case, a network operator (or user) may define the domain name of IoT device 400 such as "iot.aaa.com,' as shown in FIG. 12.

After the domain name of IoT 400 is updated at corresponding DB data in PF-DNS database 420, PF-DNS server 500 fetches router address '12.12.0.3' (e.g., router_ip) and domain name 'iot.aaa.com' (e.g., domain) from DB data and updates a PF-DNS table with the fetched information (router address and domain name of IoT device 400).

As described, the DB data associated with router 400 may be updated and stored in PF-DNS database 600 in cooperation with PF-DNS server 500 in accordance with an embodiment. Such operation of PF-DNS server 500 will be described with reference to FIG. 8 as follows.

Figure 8:
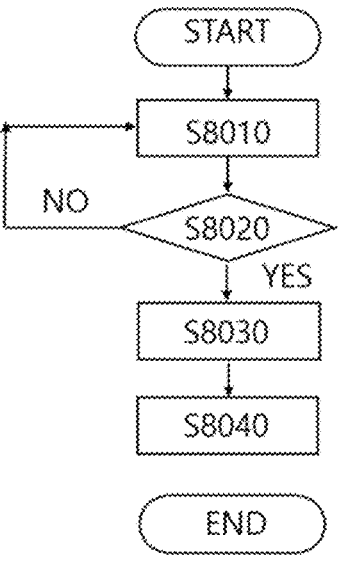
FIG. 8 is a flowchart illustrating an operation of a port forwarding domain name service (PF-DNS) server in accordance with an embodiment.

FIG. 8 is a flowchart illustrating an operation of a port forwarding domain name service (PF-DNS) server in accordance with an embodiment.

Referring to FIG. 8, PF-DNS server 500 may regularly receive information on IoT devices connected to router 400 and store information on IoT devices connected to router 400 at PF-DNS database 420 as DB data (e.g., registered IoT data) associated with router 400 at step S8010. The received information on IoT device is referred to as the collected data or connected IoT device information.

At step S8020, PF-DNS server 500 determines whether a new domain name is assigned to a newly registered IoT device based on the received information.

When the domain name is assigned at step S8020-YES, PF-DNS server 500 registers (updates) a PF-DNS table with an IP address of an IoT device and an assigned domain name based on the received information added into PF-DNS database 600 at step S8030.

At step S8040, PF-DNS server 500 transmits the DB data (e.g., registered IoT data) to router 400.

Referring back to FIG. 6, router 400 receives the DB data associated with router 400 from PF-DNS server 500 at step S6150-Update. Router 400 updates a port forwarding table at step S6160. For example, router 400 extracts a service port number from the received DB data, assigns the extracted service port as internal/external port for port forwarding, and assigns the IP address of IoT device 200 as a port forwarding target IP address at step S6160.

Figure 13:
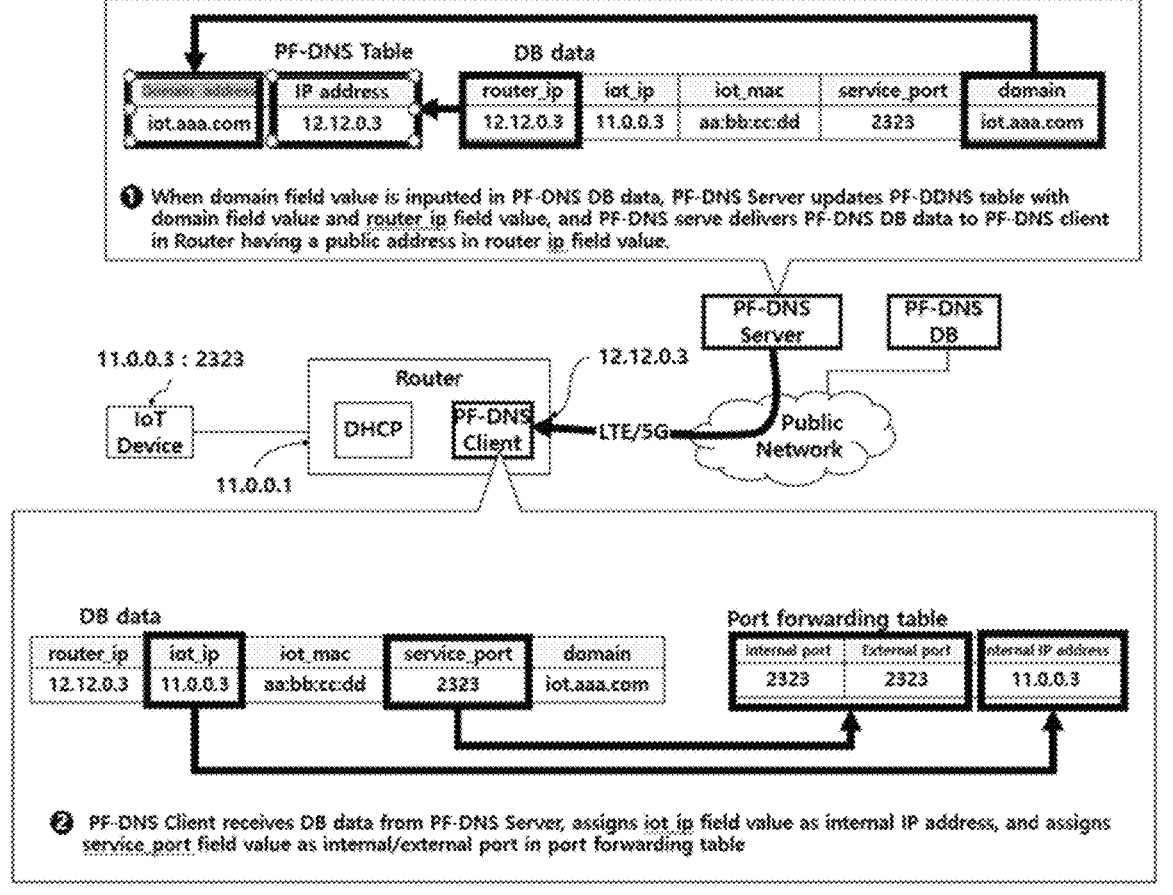
FIG. 13 shows providing registered IoT device information and updating a port forwarding table in a router in accordance with an embodiment.

FIG. 13 also shows such an updating operation. That is, PF-DNS server 500 provides the remaining information of IoT device 400 in PF-DNS database 420, such as IoT IP address, IoT MAC address, and Service Port, to PF-DNS client processor and updates a port forwarding table of PF-DNS client processor. FIG. 13 shows providing registered IoT device information and updating a port forwarding table in a router in accordance with an embodiment.

Referring to FIG. 13, a private IP address of IoT device 400 (e.g., 11.0.0.3) is assigned as an internal IP address in the port forwarding table, and a service ort number (e.g., 2323) is assigned as an internal/external port number in the port forwarding table in accordance with an embodiment.

Figure 14:
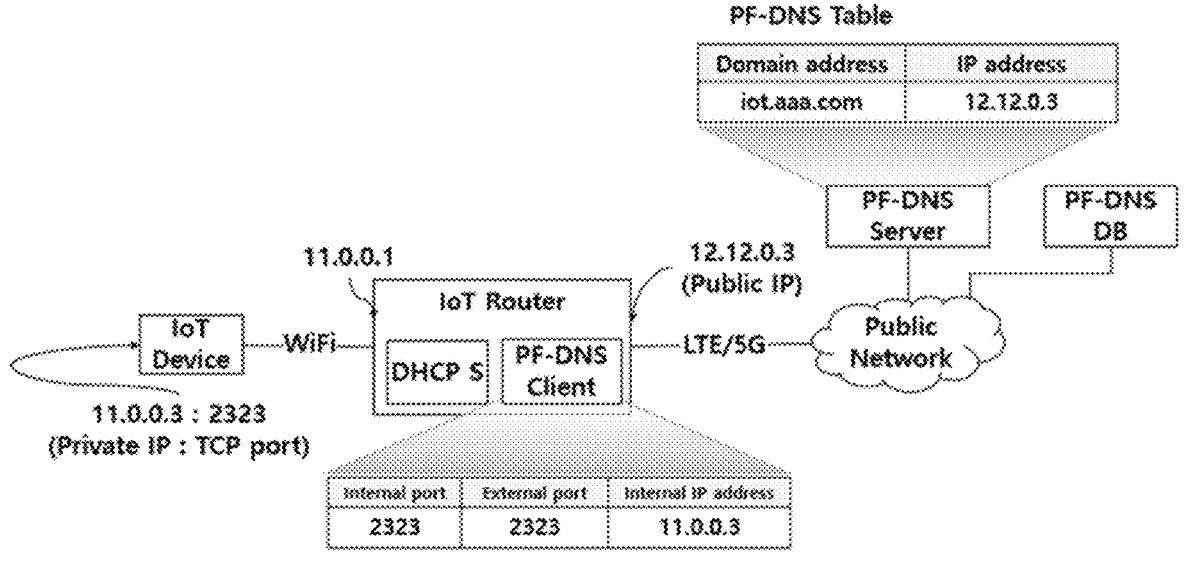
FIG. 14 shows a PF-DNS table in a PF-DNS server and a port forwarding table in a router in accordance with an embodiment.

FIG. 14 shows a PF-DNS table in a PF-DNS server and a port forwarding table in a router in accordance with an embodiment. Referring to FIG. 14, the PF-DNS table for IoT device 400 in PF-DNS server 500 is finally set to have a domain name as 'iot.aaa.com' and an IP address as '12.12.0.3.' Further, the port forwarding table for IoT device 200 in router 400 is finally set to have an internal port '2323', an external port '2323', and an internal IP address '11.0.0.3'.

Referring back to FIG. 6, in a case that router 400 receives a signal from PF-DNS server 500 at step S6020-Server/UE and the received signal is a remote access requires message at step S6150-Remote access request message, router 400 extract a service port number from the remote access request message at step S6170.

At step S6180, router 400 also determines a private IP address of a destination IoT device based on the extracted service port number using the port forwarding table. At step S6190, router 400 delivers the remote access request message to corresponding IoT device using the determined private IP address.

Hereinafter, such a method for remotely accessing an IoT device through a router using a PF-DNS server and a PF-DNS database in accordance with an embodiment will be described with reference to FIG. 15 to FIG. 18. FIG. 15 to FIG. 18 are diagrams for explaining a method for remotely accessing an IoT device through a router using a PF-DNS server and a PF-DNS database in accordance with an embodiment.

Figure 15:
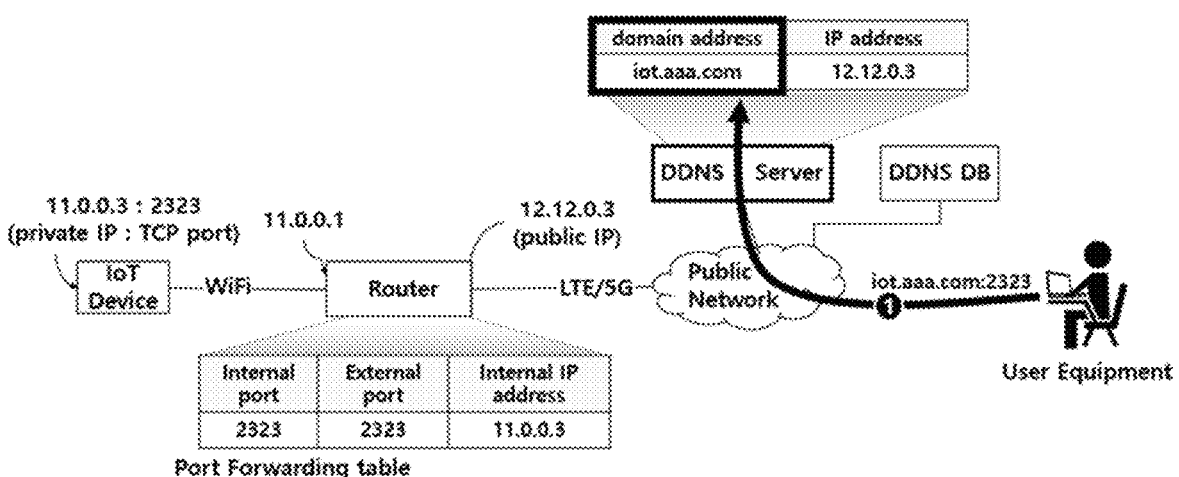
FIG. 15 to FIG. 18 are diagrams for explaining a method for remotely accessing an IoT device through a router using a PF-DNS server and a PF-DNS database in accordance with an embodiment.

As shown in FIG. 15, a user equipment of a network operator may generate a network access request message with a domain name and a service port number, for example, 'iot.aaa.com:2323' in order to control IoT device 200. Then, the user equipment requests PF-DNS server 500 an IP address corresponding to the domain address 'iot.aaa.com'.

Figure 16:
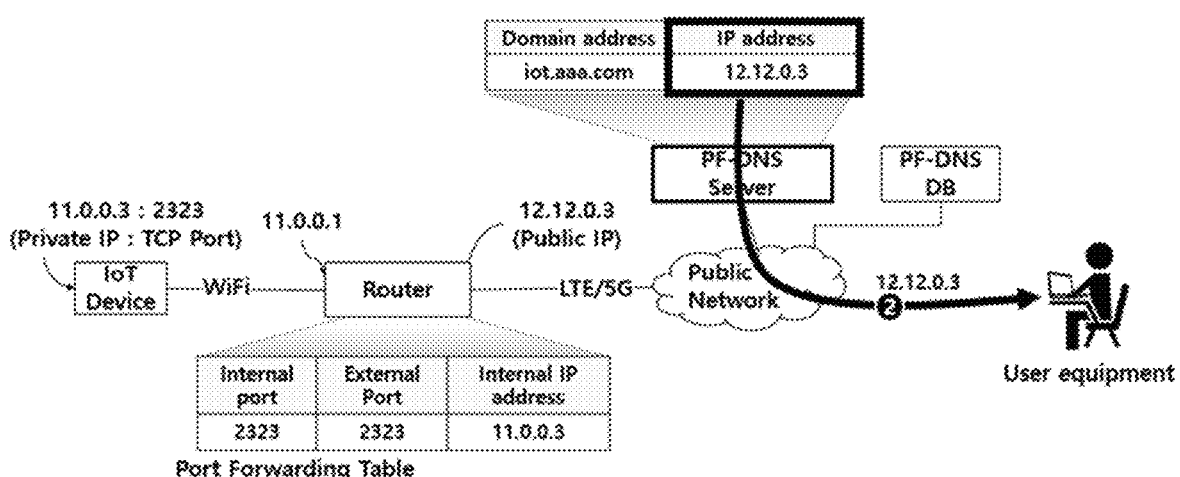

As shown in FIG. 16, PF-DNS server 500 receives the request message from the user equipment, fetches a public IP address '12.12.0.3' corresponding to the domain address 'iot.aaa.com' from PF-DNS table, and transmit the public IP address '12.12.0.3' as a response message to the user equipment. The public IP address '12.12.0.3' in the response message is the public IP address of router 400.

Figure 17:
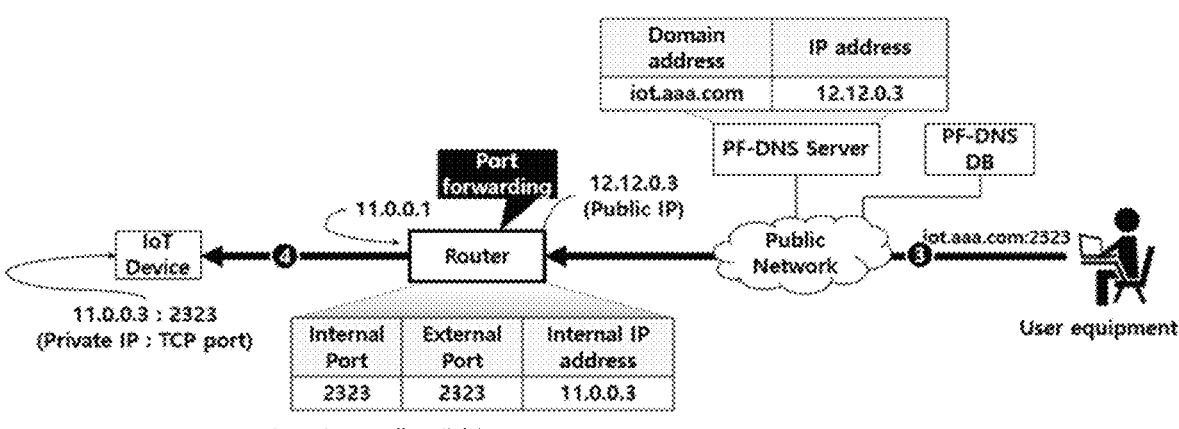

As shown in FIG. 17, the domain address including the port number 'iot.aaa.com:2323' for remotely accessing IoT device 200 is transformed with the public IP address of router 400 provided from PF-DNS server 500 to '12.12.0.3: 2323'. Then, the user equipment transmits the transformed domain address with the service port '12.12.0.3:2323' to router 400 through public network.

Router 400 receives the remote access request message with '12.12.0.3.:2323' and determines a destination's IP address corresponding to the service port number 2323 using the port forwarding table. As shown in FIG. 17, the internal port number 2323 is mapped to a private IP address of '11.0.0.3' in the port forwarding table. Router 400 delivers the remote access request message to IoT 440 using the private IP address '11.0.0.3' mapped to the service port number 2323.

Figure 18:
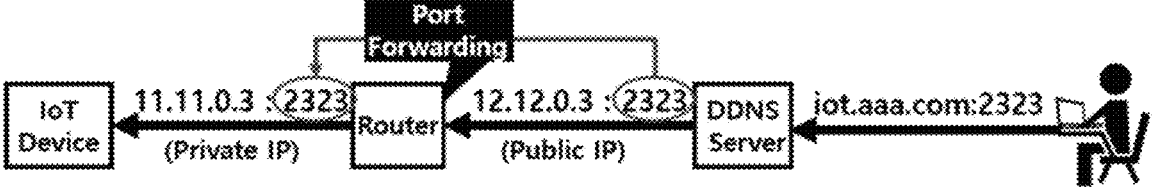

As shown in FIG. 18, user equipment transmits a remote access request message by using a domain address including a service port number, such as 'iot.aaa.com:2323' as a destination address (to IoT device 200). PF-DNS server 500 transforms the domain address to the public IP address of router 400 connected to IoT device 200 and delivers the remote access request message to router 400. Router 400 determines a private IP address of IoT device 200 based on the service port number using the port forwarding table. Finally, router 400 delivers the remote access request message to IoT device 200 as shown in FIG. 18.

As described, user equipment 100 may be enabled to remotely access to IoT device 200 in a private network through router 400 in accordance with an embodiment.

That is, i) when an IoT device initially access to a router, the router registers the newly accessed IoT device at the PF-DNS database with information on the IoT device (e.g., connected IoT device information), ii) the PF-DNS database receives and stores the information on the IoT device as registered IoT device information associated with the router, iii) the PF-DNS database updates the registered IoT device information with a domain name according to an instruction from the network operator, iv) the PF-DNS server defines a PF-DNS table with the registered IoT device information with the domain name, v) the PF-DNS server requests the router to update the port forwarding table based on the registered IoT device information.

Furthermore, the router and the PF-DNS database regularly compare the connected IoT device information stored in the router with the registered IoT device information managed in the PF-DNS database and update the registered IoT device information to maintain data validity in accordance with an embodiment.

Hereinafter, such an operation will be described again with reference to FIG. 9 to FIG. 18. That is, the operation of router for initial access of an IoT device will be described in more detail with FIG. 9. FIG. 9 is a diagram explaining the operation of a router when a new IoT device initially accesses the router in accordance with an embodiment.

Referring to FIG. 9, when IoT device 200 is initially connected to router 400, router 400 (e.g., DHCP processor) may designate an internal IP address of router 400 (e.g., '11.0.0.1') as a gateway address and allocates a private address '11.0.0.3' at S9010. IoT device 200 may register a service port number '2323' at router 400. PF-DNS client processor may manage the assigned private IP address for IoT device 200 and maintain information related to IoT device 200.

PF-DNS client processor 412 may collect, store, and manage information on IoT devices connected to router 400 whenever IoT device information is updated at DHCP processor 411. Information on IoT devices connected to router 400 refers to as DB data or Collected data.

The information on the IoT device (e.g., DB data or Collected data) may include i) a media access control (MAC) address of each IoT device connected to router 440, ii) a private IP address of each IoT device, iii) a service port number of each IoT device, iv) a lease period (Idle time) of each private IP address, and v) a public IP address of router 440.

The MAC address of IoT device is a unique identifier assigned to a network interface controller (NIC) of an IoT device. It is a hardware address that is permanently associated with an IoT device. For example, the MAC address of IoT device 200 may be set as 'aa.bb.cc.dd,' as shown in FIG. 9.

The private IP address of IoT device is an IP address allocated by DHCP processor and used within a private network. As shown in FIG. 9, IoT device 200 is assigned with '11.0.0.3' as a private IP address. The service port number of IoT device is a transmission control protocol (TCP) port number that is used to identify a service provided by an IoT device. For example, the service port number of the IoT device 200 is '2323', as shown in FIG. 9. The lease period of an IP address assigned to IoT devices refers to the duration of time which a private IP address is assigned to the IoT device within a network (e.g., remains active). For example, the lease period may be set to '1 month' as shown in FIG. 9, The IP address of router 400 refers to a public IP address used for connecting to the public network (e.g., Internet). For example, the IP address of router 400 may be '12.12.0.3' as shown in FIG. 9.

In accordance with an embodiment, router 400 may collect information on IoT device 200 from PF-DNS database 420. Hereinafter, an operation of router 400 will be described in more detail with reference to FIG. 10. FIG. 10 shows comparing the number of IP addresses included in DB data (e.g., collected data) and that in PF-DNS data in accordance with an embodiment. Referring to FIG. 10, router 400 may receive PF-DNS data from PF-DNS database 420 and obtain DB data from DHCP processor or memory. Then, router 400 determines the number of IP addresses assigned to IoT devices included in the DB data and same in the PF-DNS data.

As shown in FIG. 10, the number of IP addresses in the DB data is greater than that in the PF-DNS data. Accordingly, router 400 may determine that one IoT device is newly connected. Then, router 400 may determine whether newly connected IoT device has been registered before, never been registered, or has been disconnected by using method shown in FIG. 11. It is because an IoT device may be i) a new device that accesses router 400, ii) assigned with a new IP address because the period time is expired, iii) a device have been connected but disconnected due to error. IoT device may be distinctly registered at PF-DNS database 420.

FIG. 11 shows four steps to determine whether a newly connected IoT device is a new IoT device or not. Referring to FIG. 11, if an IoT device has the same MAC address but a different private IP address in the DB data and the PF-DNS data (e.g., determination step 1), it is determined as a lease period of a private IP address assigned to an IoT device is expired. Accordingly, a private IP address and a service port of a corresponding IoT device is updated at the PF-DNS data.

If an IoT device has a different MAC address but the same private IP address in the DB data and the PF-DNS data (e.g., determination step 2), it is determined as two different IoT devices. Accordingly, the PF-DNS data associated with the IoT device is deleted, and the DB data is stored as new PF-DNS data. If the MAC address and the IP address are identical in the DB data and the PF-DNS data (e.g., determination step 3), it is determined to maintain the PF-DNS data. If there is not identical data in the DB data and the PF-DNS data (e.g., determination step 4), it is determined to store the DB data as new PF-DNS data.

After determination shown in FIG. 11, IoT device information with a private address '11.0.0.3' is finally registered as a PF-DNS data (e.g., registered IoT device). FIG. 12 shows registering an IoT device (e.g., IoT device information) at a PF-DNS server and assigning a domain name for a new IoT device in accordance with an embodiment. Referring to FIG. 12, a registered IoT device information of IoT device 400 may be created as a DB schema in PF-DNS database 420. However, a domain name for IoT device 404 may not be assigned to be registered at PF-DNS server 500 yet. Accordingly, the DB schema for IoT device 400 has a null value in a domain name field. In this case, a network operator (or user) may define the domain name of IoT device 400 such as "iot.aaa.com,' as shown in FIG. 12.

After the domain name of IoT 400 is updated at corresponding PF-DNS data in PF-DNS database 420, PF-DNS server 500 fetches router address '12.12.0.3' (e.g., router_ip) and domain name 'iot.aaa.com' (e.g., domain) from PF-DNS data and updates a DDNS table with the fetched information (router address and domain name of IoT device 400).

Then, PF-DNS server 500 provides the remaining information of IoT device 400 in PF-DNS database 420, such as IoT IP address, IoT MAC address, and Service Port, to PF-DNS client processor and updates a port forwarding table of PF-DNS client processor. Such an operation is shown in FIG. 13. FIG. 13 shows providing registered IoT device information and updating a port forwarding table in a router in accordance with an embodiment. Referring to FIG. 13, a private IP address of IoT device 400 (e.g., 11.0.0.3) is assigned as an internal IP address in the port forwarding table, and a service ort number (e.g., 2323) is assigned as an internal/external port number in the port forwarding table in accordance with an embodiment.

FIG. 14 shows a PF-DNS table in a PF-DNS server and a port forwarding table in a router in accordance with an embodiment. Referring to FIG. 14, the PF-DNS table for IoT device 400 in PF-DNS server 500 is finally set to have a domain name as 'iot.aaa.com' and an IP address as '12.12.0.3.' Further, the port forwarding table for IoT device 200 in router 400 is finally set to have an internal port '2323', an external port '2323', and an internal IP address '11.0.0.3'.

Hereinafter, a method for remotely accessing an IoT device through a router using a PF-DNS server and a PF-DNS database in accordance with an embodiment will be described with reference to FIG. 15 to FIG. 18. FIG. 15 to FIG. 18 are diagrams for explaining a method for remotely accessing an IoT device through a router using a PF-DNS server and a PF-DNS database in accordance with an embodiment.

As shown in FIG. 15, a user equipment of a network operator may generate a network access request message with a domain name and a service port number, for example, 'iot.aaa.com:2323' in order to control IoT device 200. Then, the user equipment requests PF-DNS server 500 an IP address corresponding to the domain address 'iot.aaa.com'.

As shown in FIG. 16, PF-DNS server 500 receives the request message from the user equipment, fetches a public IP address '12.12.0.3' corresponding to the domain address 'iot.aaa.com' from PF-DNS table, and transmit the public IP address '12.12.0.3' as a response message to the user equipment. The public IP address '12.12.0.3' in the response message is the public IP address of router 400.

As shown in FIG. 17, the domain address including the port number 'iot.aaa.com:2323' for remotely accessing IoT device 200 is transformed with the public IP address of router 400 provided from PF-DNS server 500 to '12.12.0.3:2323'. Then, the user equipment transmits the transformed domain address with the service port '12.12.0.3:2323' to router 400 through public network.

Router 400 receives the remote access request message with '12.12.0.3.:2323' and determines a destination's IP address corresponding to the service port number 2323 using the port forwarding table. As shown in FIG. 17, the internal port number 2323 is mapped to a private IP address of '11.0.0.3' in the port forwarding table. Router 400 delivers the remote access request message to IoT 440 using the private IP address '11.0.0.3' mapped to the service port number 2323.

As shown in FIG. 18, user equipment transmits a remote access request message by using a domain address including a service port number, such as 'iot.aaa.com:2323' as a destination address (to IoT device 200). PF-DNS server 500 transforms the domain address to the public IP address of router 400 connected to IoT device 200 and delivers the remote access request message to router 400. Router 400 determines a private IP address of IoT device 200 based on the service port number using the port forwarding table. Finally, router 400 delivers the remote access request message to IoT device 200 as shown in FIG. 18.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present disclosure can be embodied in the form of methods and apparatuses for practicing those methods. The present disclosure can also be embodied in the form of program code embodied in tangible media, non-transitory media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present disclosure can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present disclosure can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard and would be recognized by other elements as sufficiently capable of communicating with the other elements in the manner specified by the standard. The compatible element does not need to operate internally in a manner specified by the standard.

No claim element herein is to be construed under the provisions of 35 U.S.C. § 112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A router for supporting a remote access to an Internet of things (IOT) device connected to a private network, the router comprising:

a memory configured to store information and data received from or transmitted to other devices, and generated in the router and store a port forwarding table;

a transceiver circuit configured to receive a remote access request message including a service port number of an IoT device connected to a private network from a user equipment of a network operator connected to the router through a public network; and a processor circuit configured to perform port forwarding between the user equipment and the IoT device using a private IP address corresponding to the service port number of the IOT device based on the port forwarding table stored in the memory, wherein:

the processor circuit is configured to determine data validity of connected IOT device information by comparing the connected IOT device information with registered IoT device information; and the transceiver circuit is configured to transmit an update request message to a database for updating the registered IoT device information based on a result of comparing the connected IoT device information with the registered IoT device information, wherein the registered IoT device information is updated at the database based on the update request message, wherein the processor circuit is configured to:

allocate the private IP address to the IoT device connected to the router and manage the allocated private IP address and connected IoT device information on the IoT device; and collect information on registered IoT device information for IOT devices registered at the database from the database, wherein the connected IOT device information includes a MAC address, a private IP address, a service port number, a lease period of the private IP address, and a public IP address of the router wherein the processor circuit is configured to:

compare a number of private IP addresses allocated to IoT devices connected to the router with a number of IP addresses registered at the database; and determine that a new IOT device is connected to the router or a connected IoT device is released in an event that the number of private IP addresses allocated to IoT devices is not matched with the number of IP addresses registered at the database.

2. The router of claim 1, wherein the processor circuit is configured to:

transmit an update request message including the connected IOT device information to the database in an event that the number of private IP addresses allocated to IoT devices is not matched with the number of IP addresses registered at the database.

3. The router of claim 1, wherein the processor circuit is configured to assign an internal port number and an external port number in the port forwarding table with the service port number of the IoT device and assign an internal IP address included in the port forwarding table with the private IP address.

4. The router of claim 1, wherein a domain address mapped to the IoT device and an IP address of a router connected to the IoT device are managed through a domain name service table in a server.

5. The router of claim 4, wherein in an event that the domain address mapped to the IoT device is transmitted to a server from a user equipment of a network operator, the IP address of the router corresponding to the domain address is transmitted to the user equipment from the server, and the user equipment is connected to the router through the IP address of the router.

6. The router of claim 1, wherein in an event that a remote access request message including a service port number of the IoT device is received from the user equipment, processor circuit is configured to receive an internal IP address mapped to the internal port number based on a port forwarding table that manages an internal port number corresponding to the service port number of the IoT device and transmit the remote access request message to the IoT device.

7. A method of a router for supporting remote access to an IoT device connected to a private network, the method comprising:

receiving a remote access request message including a service port number of an IoT device connected to a private network from a user equipment of a network operator, connected to the router through a public network;

performing port forwarding between the user equipment and the IoT device using a private IP address corresponding to the service port number of the IoT device based on a port forwarding table, performing validity check on the IoT device connected to the private network based on connected IoT device information and registered IoT device information, where the connected IoT device information is information on IoT devices connected to the router, and the registered IoT device information is information on IoT devices registered at a database;

transmitting an update request message to the database for updating the registered IoT device information at the database based on result of the validity check, wherein the registered IOT device information is updated based on the update request message;

allocating the private IP address to the IoT device connected to the router and managing the private IP address and the connected IOT device information; and collecting the registered IoT device information from the database, wherein the connected IoT device information includes a MAC address, a private IP address, a service port number, a lease period of the private IP address, and a public IP address of the router, wherein the performing validity check comprises:

comparing a number of private IP addresses allocated to IoT devices connected to the router and a number of IP address registered at the database; and in an event that the number of private IP addresses is not matched with the number of IP address, determining that a new IoT device is connected or a connected IoT device is released.

8. The method of claim 7, wherein the transmitting a update request message comprises:

transmitting an update request message including the connected IOT device information to the database in an event that the number of private IP addresses is not matched with the number of IP address.

9. The method of claim 7, further comprising:

setting an internal port number and an external port number in the port forwarding table with the service port number of the IoT device and setting an inter IP address included in the port forwarding table with the private IP address.

10. The method of claim 7, wherein a domain address mapped to the IoT device and the IP address of the router connected to the IoT device are managed through a domain name service table at a server.

11. The method of claim 10, wherein the IP address of the router corresponding to the transferred domain address is transmitted to the user equipment from the server in an event that the domain address mapped to the IoT device is transmitted to the server from the user equipment, and the user equipment is connected to the router based on the IP address of the router.

12. The method of claim 7, further comprising:

in an event that a remote access request message including a service port number of the IoT device is received from the user equipment, transmitting the remote access request message to the IoT device allocated with an internal IP address mapped to the internal port number based on a port forwarding table managing the internal port number corresponding to the service port number of the IoT device.

* * * * *